United States Patent
Takahashi et al.

(10) Patent No.: US 9,457,721 B2
(45) Date of Patent: Oct. 4, 2016

(54) DOOR MIRROR OF VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Akira Takahashi, Toyokawa (JP); Takanori Goke, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/661,854

(22) Filed: Mar. 18, 2015

(65) Prior Publication Data
US 2015/0266425 A1 Sep. 24, 2015

(30) Foreign Application Priority Data

Mar. 19, 2014 (JP) .................................. 2014-056598

(51) Int. Cl.
G02B 7/182 (2006.01)
G02B 5/08 (2006.01)
G02B 7/18 (2006.01)
B60R 1/06 (2006.01)
B60R 1/00 (2006.01)

(52) U.S. Cl.
CPC *B60R 1/06* (2013.01); *B60R 1/006* (2013.01)

(58) Field of Classification Search
CPC ........... B60R 1/06; B60R 1/006; B60R 9/05; B60R 9/052; B60R 9/055

USPC .......................................... 359/841, 844, 871
See application file for complete search history.

(56) References Cited

U.S. PATENT DOCUMENTS

| 4,449,796 A * | 5/1984 | Janssen | B60R 1/0602 359/507 |
| 6,712,413 B1 * | 3/2004 | Flowerday | B60R 1/06 248/476 |
| 2003/0026008 A1 * | 2/2003 | Tanaka | B60R 1/06 359/838 |

FOREIGN PATENT DOCUMENTS

| JP | 2007-137130 A | 6/2007 |
| JP | 4240383 B2 | 3/2009 |
| KR | 2002-0055330 A | 7/2002 |

* cited by examiner

*Primary Examiner* — Jade R Chwasz
(74) *Attorney, Agent, or Firm* — Birch, Stewart, Kolasch & Birch, LLP

(57) ABSTRACT

A door mirror of a vehicle includes a housing and a base portion attaching the housing to a side surface of a vehicle body. The base portion includes: an attachment portion fixed to the side surface; and a support portion provided to protrude from the attachment portion toward a vehicle-width-direction outer side, and supporting the housing from below. The support portion is formed into a sectional shape of an inverse wing having a lower surface bulging downward in a vertically sectional shape in a front/rear direction, and the support portion is provided with a bead portion in the lower surface of the support portion, the bead portion protruding downward and extending in the front/rear direction so as to be gradually separated from the side surface as it goes toward a rear of the vehicle.

13 Claims, 5 Drawing Sheets

DOOR MIRROR OF VEHICLE

CROSS-REFERENCE TO RELATED APPLICATION(S)

This application is based upon and claims the benefit of priority from prior Japanese patent application No. 2014-056598, filed on Mar. 19, 2014, the entire contents of which are incorporated herein by reference.

BACKGROUND

The present invention relates to the structure of a door mirror of a vehicle.

A door mirror is attached in front of a front door of a vehicle. When the vehicle runs, wind blows against the vehicle body and flows around the door mirror. The wind flowing around the door mirror is a mixture of winds including wind hitting a front glass from ahead and flowing toward the door mirror, wind hitting the door mirror straightly from ahead, wind rising from a tire and hitting the door mirror, and so on. The wind hitting the door mirror is dispersed by the door mirror and separated from the door mirror to flow rearward. On this occasion, in the vicinity of a housing of the door mirror, the dispersed wind is split into an air current passing between the housing and a side surface of the vehicle body, an air current passing through an upper side of the housing, an air current passing through a side (vehicle-width-direction outer side) of the housing, and an air current passing through a lower side of the housing. Then, the split air currents flow rearward.

As described above, the complex air currents occur in the vicinity of the door mirror when the vehicle runs. Accordingly, the change of sound pressure of wind noise caused by turbulence of the air currents may be sensed as noisy sound by a passenger. In addition, the wind (air current) passing between the housing and the side surface of the vehicle body flows toward the vicinity of the door glass so that sound generated by the flowing of the wind may be heard as noise by the passenger. In addition, the wind (air current) having been separated from the door mirror may generate a vortex, which may hit the door glass to be heard as noise. There have been proposed techniques aiming at reducing aerodynamic noise which is caused by the flows of winds generated thus in the vicinity of a door mirror when the vehicle is running.

For example, JP-A-2007-137130 discloses a door mirror having a protrusion. The protrusion is formed in the surface of the vicinity of a vehicle rear side edge portion of an attachment portion serving as a base portion fixed to a vehicle body, so as to extend along the side edge portion. This technique suggests that a turbulent flow occurring due to wind blowing between a housing and the attachment portion of the door mirror is separated from the vehicle body (door glass surface) and allowed to flow rearward by the protrusion formed in the side edge portion, so that the sound of the wind as noise can be reduced.

In addition, Japanese Patent No. 4240383 discloses a door mirror having a configuration in which a plurality of protrusions are arranged side by side only in an outer side surface of a housing not facing a vehicle, so that an air current flowing along the outer side surface can flow among the protrusions to be rectified. This technique suggests that the air current flowing toward the outer side surface of the door mirror can be rectified by the protrusions formed in the outer side surface to thereby prevent fluctuation in pressure and vibration in the mirror caused by a separation vortex.

Wind from any direction gathers on the lower side of the housing among the flows of winds in the vicinity of the door mirror of the vehicle. Accordingly, the flow velocity, the flow rate or the direction is disturbed easily so that aerodynamic noise can be generated due to fluctuation in the flow velocity, the flow rate or the direction. The aforementioned JP-A-2007-137130 and Japanese Patent No. 4240383 disclose techniques for rectifying the wind (air current) flowing between the housing of the door mirror and the vehicle body and the wind (air current) flowing along the outer side surface of the housing. However, the aforementioned JP-A-2007-137130 and Japanese Patent No. 4240383 are not focused on the wind passing through the lower side of the housing of the door mirror.

SUMMARY

An object of the invention is to provide a door mirror of a vehicle which is designed to be capable of reducing aerodynamic noise caused by the flows of winds generated in the vicinity of the door mirror when the vehicle is running. Incidentally, in addition to the object, it may be also positioned as another object of the invention to attain operations and effects which cannot be obtained by the background art but can be derived from respective constituents shown in an undermentioned embodiment of the invention.

According to the invention, there is provided a door mirror of a vehicle, the door mirror including: a housing in which a mirror is accommodated; and a base portion adapted to attach the housing to a side surface of a vehicle body, wherein: the base portion includes: an attachment portion which is fixed to the side surface of the vehicle body; and a support portion which is provided to protrude from the attachment portion toward a vehicle-width-direction outer side, and which is adapted to support the housing from below; and the support portion is formed into a sectional shape of an inverse wing having a lower surface bulging downward in a vertically sectional shape in a front/rear direction of the vehicle, and the support portion is provided with a bead portion in the lower surface of the support portion, the bead portion protruding downward and extending in the front/rear direction of the vehicle so as to be gradually separated from the side surface of the vehicle body as it goes toward a rear of the vehicle.

The support portion may have a rear surface which extends in a rear end of the support portion in an up/down direction to be connected to an upper surface and the lower surface.

The bead portion may be formed at a rear of a front/rear-direction center of the support portion.

A rear end of the bead portion may be disposed in front of a rear end of the support portion; and a curvature radius of the rear end of the bead portion may be smaller than a curvature radius of the rear end of the support portion.

DETAILED DESCRIPTION OF EXEMPLARY EMBODIMENTS

An embodiment of the invention will be described below with reference to the drawings. Incidentally, the following embodiment is merely an example. There is no intention of excluding various modifications or technique applications which will not be stated explicitly in the following embodiment. Respective constituents of the following embodiment may be modified variously and carried out without departing from the scopes and spirits of those constituents and may be used selectively or combined suitably if occasion demands.

(1. Structure)

A door mirror 1 of a vehicle according to the embodiment will be described with reference to FIG. 1 to FIG. 5.

Figure 1:
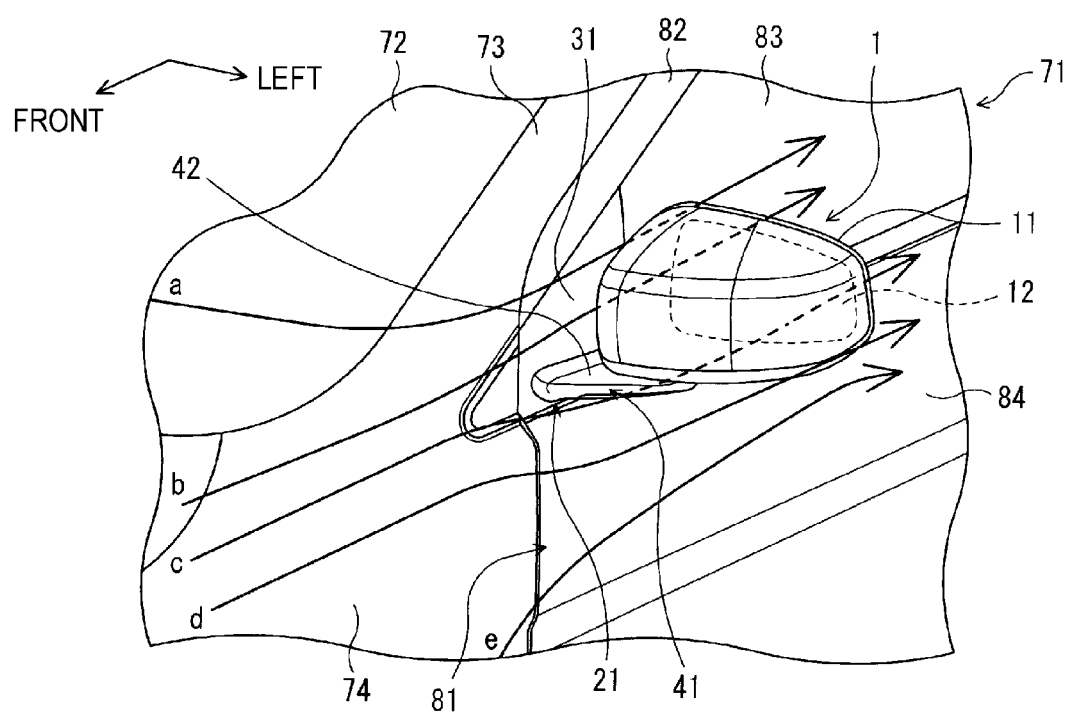
FIG. 1 is a perspective view showing a left front side surface of a vehicle provided with a door mirror according to an embodiment.
Figure 2:
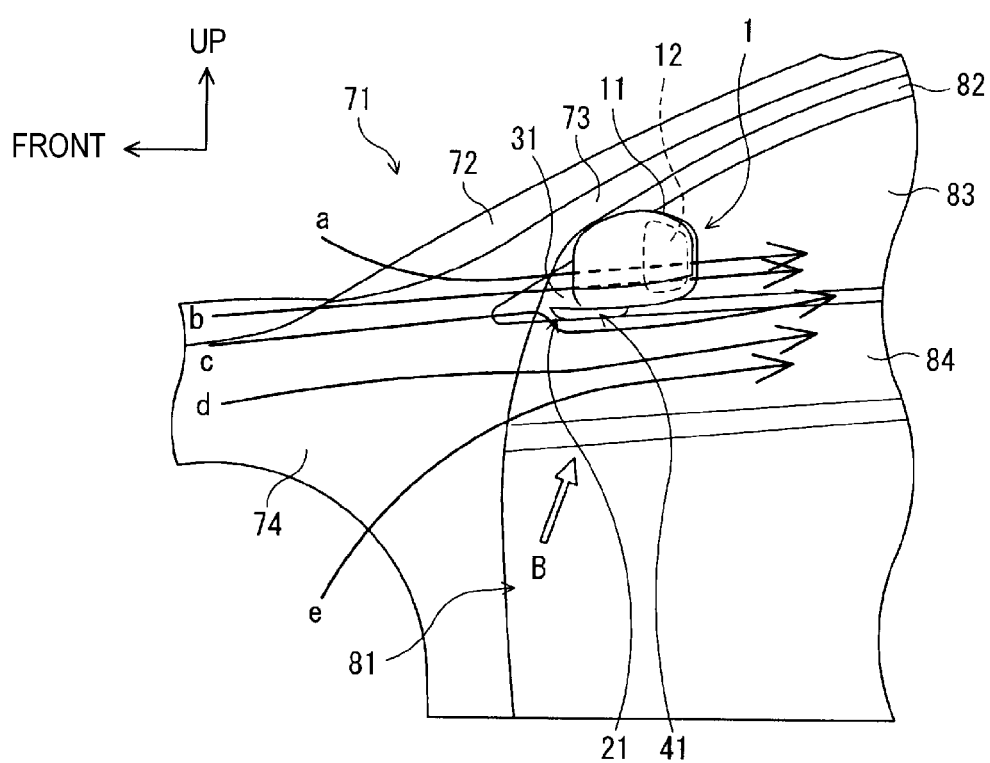
FIG. 2 is a view showing the left side surface of the front portion of the vehicle provided with the door mirror according to the embodiment.
Figure 3:
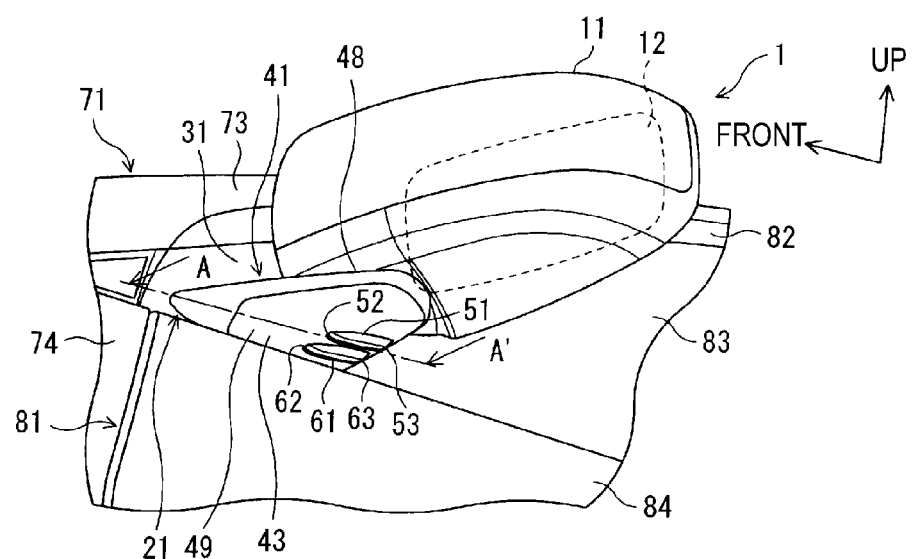
FIG. 3 is a perspective view showing a side lower surface of the door mirror according to the embodiment.

FIG. 1 is a perspective view showing the periphery of the door mirror 1 on a left side of the vehicle provided with the door mirror 1 according to the embodiment. FIG. 2 is a view showing a left side surface of a front portion of the vehicle in FIG. 1. FIG. 3 is a perspective view (view taken in the direction of an arrow B of FIG. 2) when the door mirror 1 according to the embodiment is seen upward from a side lower side toward a slightly rear side. In the following description, a vehicle travelling direction is designated as front, an opposite direction to the vehicle travelling direction is designated as rear, and left and right are defined based on the front. In addition, description will be made on the condition that a gravity direction is designated as down, and an opposite direction to the gravity direction is designated as up. Incidentally, although the door mirror 1 attached to the left side surface of the vehicle will be described here, a door mirror attached to a right side surface of the vehicle also has the same configuration so as to be symmetric to the door mirror 1 according to the embodiment.

As shown in FIG. 1 and FIG. 2, the door mirror 1 is attached to the vicinity of a front end portion (lower end portion) of a front pillar 73 in a front end portion of a front door 81. More specifically, the door mirror 1 is attached to a region surrounded by a front end portion of a door sash 82 in front of a door glass 83 and a door panel 84.

The door mirror 1 includes a housing 11 in which a mirror 12 is accommodated, and a base portion 21 which is adapted to attach the housing 11 a side surface of a vehicle body 71. The base portion 21 includes an attachment portion 31 which is fixed to the side surface of the vehicle body 71, and a support portion 41 which is provided to protrude from the attachment portion 31 toward the outer side in a vehicle width direction so as to support the housing 11 from below. The attachment portion 31 of the base portion 21 is bolted onto, of the door sash 82 of the front door 81, the front end portion which is located in front of the door glass 83. Thus, the door mirror 1 is attached.

The support portion 41 is provided to protrude substantially horizontally from the attachment portion 31 toward the outer side in the vehicle width direction so as to be substantially in parallel to the front/rear direction of the vehicle.

As shown in FIG. 1, the housing 11 is disposed in, of an upper surface 42 of the support portion 41, the vicinity of an end portion of the outer side in the vehicle width direction, so as to be spaced from the attachment portion 31. A not-shown shaft is inserted through the housing 11 from below and fastened with a bolt. Thus, the housing 11 is attached to the support 41 rotatably around the shaft. The door mirror 1 according to the embodiment is a folding type. During driving, the housing 11 is unfolded sideways so that the mirror 12 can face rearward, as shown in FIG. 1. Thus, a driver can check the rear side of the vehicle body 71 through the mirror 12. On the other hand, for example, in the case where the vehicle is parked or running in a defile, the housing 11 can be folded rearward and accommodated.

Figure 4:
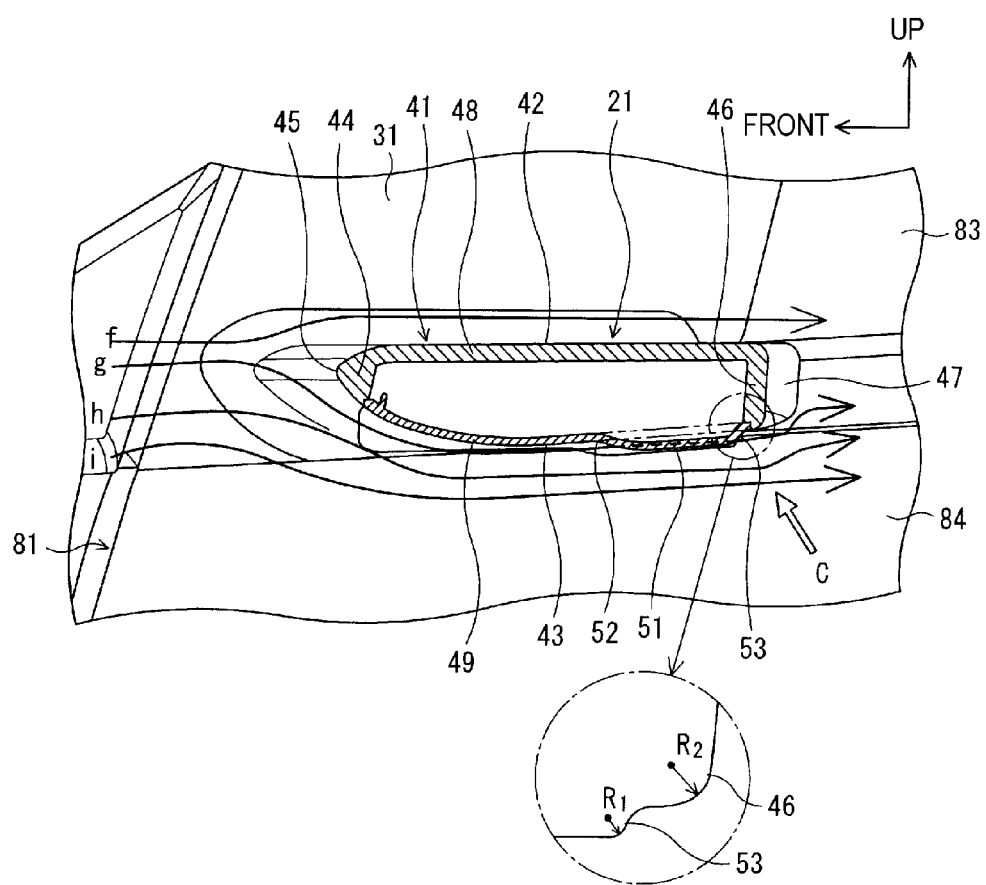
FIG. 4 is a vertically sectional view showing a support portion when the door mirror according to the embodiment is seen from the left side.
Figure 5:
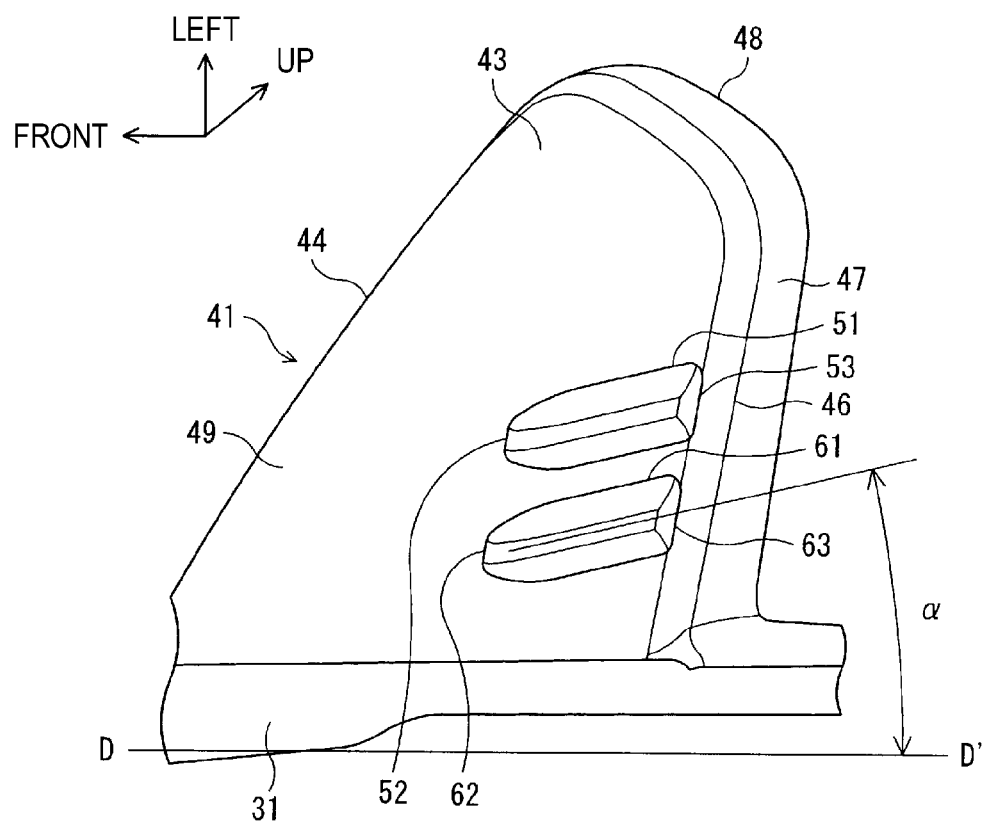
FIG. 5 is a perspective view showing a rear lower surface of a base portion of the door mirror according to the embodiment.

Next, the structure of the support portion 41 will be described in detail. FIG. 4 is a vertically sectional view (sectional view taken along the line of arrows A-A' of FIG. 3) of the support portion 41 when the door mirror 1 is seen from the left side. The section of FIG. 4 shows a plane which is perpendicular to a horizontal plane, and in which the support portion 41 is cut in the up/down direction along a top portion of a bead portion 51 which will be described later. FIG. 5 is a perspective view (view taken in the direction of an arrow C of FIG. 4) when the base portion 21 of the door mirror 1 is seen upward from the rear lower side toward the slightly front side. Incidentally, although the section passing through the top portion of the bead portion 51 is depicted by a solid line in FIG. 4, the shape of a lower surface 43 formed by the support portion 41 provided with no bead portion 51 is depicted by a two-dot chain line. That is, the shape of the vertical section of the support portion 41 provided with no bead portion 51 in the front/rear direction of the vehicle is the shape in which the portion corresponding to the bead portion 51 is depicted by the two-dot chain line in the section of FIG. 4.

As shown in FIG. 3 and FIG. 4, the support portion 41 includes an upper side member 48 and a lower side member 49. The upper side member 48 is provided to protrude from the attachment portion 31 to form the upper surface 42, a front edge 44, a rear end 46, and a part of the lower surface 43 of the support portion 41. The lower side member 49 forms the lower surface 43 of the support portion 41. Bead portions 51 and 61 are formed integrally with the lower side member 49. That is, the support portion 41 can be formed when the lower side member 49 is mounted on a lower side of the upper side member 48. Here, the upper side member 48 is molded integrally with the attachment portion 31. The lower side member 49 is mounted after the housing 11 is positioned on an upper surface of the upper side member 48 (the upper surface 42 of the support portion 41) and fastened with a bolt from the lower side of the upper side member 48.

The support portion 41 is formed as shown in FIG. 3 and FIG. 5. That is, when the support portion 41 is seen from below, the front edge 44 is retreated from the attachment portion 31 toward the outer side in the vehicle width direction, so that the support portion 41 becomes oblique with respect to a parallel plane D-D' of the vehicle and narrow in length in the front/rear direction. Thus, the support portion 41 is formed into a retreated wing shape as a triangular shape in which a surface tangent to the attachment portion 31 is set as the base and an opposite vertex of the base is cut off.

As shown in FIG. 4, the vertically sectional shape of the support portion 41 in the front/rear direction of the vehicle corresponds to the sectional shape of an inverse wing in which the lower surface 43 is formed into a curved shape to bulge downward while the upper surface 42 has a substantially flat shape. The support portion 41 is formed in such a manner that the front edge 44 where the upper surface 42 and the lower surface 43 are merged with each other in the front direction of the vehicle draws a smooth curved surface to become a tapered shape toward the front. A front end 45 as a front end portion of the front edge 44 is provided closely to the upper surface 42 of the support portion 41.

The upper surface 42 overhangs upward from the front end 45 and is then formed into a flat shape substantially horizontal in the rear portion from the front edge 44. The lower surface 43 is formed as follows. That is, a portion of the lower surface 43 ranging from the front end 45 up to the vicinity of an intermediate portion of the support portion 41 is curved downward and overhangs more largely than the upper surface 42, and a rear portion of the lower surface 43 further draws a gentle curve and approaches the upper surface 42 side as it goes toward the rear end 46.

In this manner, the vertically sectional shape of the support portion 41 is formed into the aforementioned sectional shape of the inverse wing. Accordingly, when the vehicle is running, the flow velocity of wind flowing along the lower surface 43 of the support portion 41 is higher than the flow velocity of wind flowing along the upper surface 42 of the support portion 41.

In addition, the support portion 41 has a rear surface 47 in the rear end 46 thereof. The rear surface 47 is extended in the up/down direction and connected to the upper surface 42 and the lower surface 43. That is, in the support portion 41, the upper surface 42 and the lower surface 43 do not approach each other and then do not gather into a sharpened edge (rear edge) as they go toward the rear portion. As shown in FIG. 4, corner portions each having a curvature radius $R_2$ are formed in upper and lower parts of the rear portion between the upper surface 42 and the lower surface 43 respectively so that the rear surface 47 having a substantially flat shape can be formed. Thus, a rear end portion of the support portion 41 is formed into a shape with which wind flowing along the upper surface 42 of the support portion 41 and wind flowing along the lower surface 43 of the same can be easily separated from the upper surface 42 and the lower surface 43 respectively.

As shown in FIG. 5, the bead portions 51 and 61 are provided in the lower surface 43 of the support portion 41 so as to protrude downward and extend in the front/rear direction of the vehicle. Each of the bead portions 51 and 61 extends in the front/rear direction of the vehicle so as to form a predetermined angle $\alpha$ with respect to the parallel plane D-D' of the vehicle. That is, the bead portion 51, 61 is provided to be inclined toward the rear and toward the outer side in the vehicle width direction so as to be gradually separated from the side surface of the vehicle body 71 as it goes toward the rear of the vehicle. Although the angle $\alpha$ between the bead portion 61 and the parallel plane D-D' of the vehicle is schematically shown in FIG. 5, the bead portion 51 is also provided at the angle $\alpha$ with respect to the parallel plane of the vehicle in the same manner. That is, the two bead portions 51 and 61 are provided to extend substantially in parallel.

Each of the bead portions 51 and 61 is a protrusion having a fin shape. More specifically, the bead portion 51, 61 is substantially formed into a pyramid shape which has round corner portions and extends in the front/rear direction of the vehicle. The lower end of the bead portion 51, 61 (that is, the top portion of the bead portion 51, 61) is not sharpened but is formed into a curved shape or a flat shape. In addition, a front end 52, 62 of the bead portion 51, 61 is formed into a tapered shape. As shown in FIG. 4, the bead portion 51, 61 has a corner portion with a curvature radius $R_1$ in the vicinity of a rear end 53, 63 and is formed to be tangent to the rear end 46 of the support portion 41 so as to be warped inward while a gentle curved surface rising from the support portion 41 to increase a protrusion amount is drawn in the vicinity of the rear end 52, 62 of the bead portion 51, 61.

The front end 52, 62 of the bead portion 51, 61 is formed at the rear of the rear/front-direction center of the support portion 41. That is, the front end 52, 62 of the bead portion 51, 61 is provided in a portion of the lower surface 43 which is at the rear of the front edge 44 of the support portion 41 and which draws a gentle curve. More preferably, the bead portion 51, 61 is formed in a position which is about one third on the rear side in the front/rear-direction position of the support portion 41.

The rear end 53, 63 of the bead portion 51, 61 is formed more slightly in front of the rear end 46 of the support portion 41. Specifically, as shown in FIG. 4, the rear end 53, 63 of the bead portion 51, 61 is formed in front of the rear end 46 of the support portion 41 and formed to be warped inward. Thus, in the rear portion of the support portion 41, a step is provided on the front side of the rear end 46 by the bead portion 51, 61. In addition, as shown in FIG. 4, the curvature radius $R_1$ of the rear end 53, 63 of the bead portion 51, 61 is formed to be smaller than the curvature radius $R_2$ of the rear end 46 of the support portion 41.

The angle $\alpha$ between the bead portion 51, 61 and the parallel plane D-D' of the vehicle is preferably large than 0° in order to use the bead portion 51, 61 to rectify the direction of wind (air flow) passing through the lower surface 43 side of the support portion 41 to go farther from the door glass 83. On the other hand, the angle $\alpha$ is preferably smaller than 30° in order to prevent the bead portion 51, 61 itself from being resistant against the wind and generating noise.

(2. Operations and Effects)

As shown in FIG. 1 and FIG. 2, a mixture of winds (air currents) schematically designated by arrows a to e in FIG. 1 and FIG. 2 flows around the aforementioned door mirror 1 when the vehicle provided with the door mirror 1 is running. Specifically, the arrow a expresses a flow in which the wind hitting the front glass 72 and flowing toward the door mirror 1 side during the running of the vehicle passes through a space between the housing 11 and the attachment portion 31 (vehicle body 71) and then passes rearward. The arrow b expresses a flow in which the wind flowing from the front of the door mirror 1 passes through the space between the housing 11 and the attachment 31 and through the upper side of the support portion 41. In addition, the arrow c expresses a flow in which the wind flowing from the front of the door mirror 1 hits the support portion 41 and passes through the lower side of the support portion 41. The arrow d expresses a flow in which the wind passes through the vicinity of a front fender 74 and passes under the support portion 41. The arrow e expresses a flow in which the wind rises from a tire and passes through the lower side of the door mirror 1. In this manner, the complex air currents occur in the vicinity of the door mirror 1 when the vehicle is running.

Among these wind flows, the flows of the winds (air currents) flowing from the front of the door mirror 1 and passing through the periphery of the support portion 41 are schematically designated by arrows f to i in FIG. 4. In FIG. 4, the arrows f to i express the flows in each of which the wind flowing from the front of the door mirror 1 during the running of the vehicle hits the support portion 41 to branch and passes toward the rear of the support portion 41. More specifically, the arrow f expresses the flow in which the wind passes through the upper side (upper surface 42 side) of the support portion 41. The arrows g to i express the flows in each of which the wind passes through the lower side (lower surface 43 side) of the support portion 41.

As shown in FIG. 1, FIG. 2, and FIG. 4, the upper side of the support portion 41 becomes a narrow space between the attachment portion 31 fixed to the side surface of the vehicle body 71 and the housing 11. Accordingly, noise increases when the flow rate of the wind flowing through the upper side of the support portion 41 as designated by each of the arrow a, the arrow b and the arrow f increases. In addition, as shown in FIG. 4, the wind passing through the upper side of the support portion 41 as designated by the arrow f is separated from the support portion 41 to generate a vortex. The wind hitting the door glass 83 also leads to the increase of noise.

On the other hand, according to the aforementioned door mirror 1, the support portion 41 is formed into the sectional shape of an inverse wing in which the lower surface 43 bulges downward in the vertically sectional shape in the front/rear direction of the vehicle. Therefore, the flow velocity of the wind passing through the lower side of the support portion 41 along the lower surface 43 as designated by each of the arrows g to i in FIG. 4 is higher than the flow velocity of the wind passing through the upper side of the support portion 41 along the upper surface 42 as designated by the arrow f. Thus, the wind coming from ahead can be made to flow toward the lower side of the support portion 41 aggressively so that the flow rate of the wind flowing toward the upper side of the support portion 41 to cause noise can be reduced. In addition, since the flow velocity of the wind passing through the lower side of the support portion 41 is increased, the wind which has passed through the upper side of the support portion 41 is pulled downward by the wind which is higher in flow velocity and which has passed through the lower side of the support portion 41. Thus, the wind which has passed through the upper side of the support portion 41 can be separated to flow rearward while being suppressed from being separated in an obliquely upper direction. Accordingly, the wind can be made to flow more downward than the door glass 83. Thus, the wind which flows from the front of the door mirror 1 and which is separated from the support portion 41 to thereby generate a vortex can be prevented from hitting the door glass 83 so that noise can be reduced.

In addition, according to the aforementioned door mirror 1, each of the bead portions 51 and 61 is provided in the lower surface 43 of the support portion 41 to protrude downward and extend in the front/rear direction of the vehicle so as to be gradually separated from the side surface of the vehicle body 71 as it goes toward the rear of the vehicle. The wind flowing through the lower side of the support portion 41 as designated by each of the arrows g to i is rectified by the bead portions 51 and 61. Thus, the wind which is being separated from the lower surface 43 is urged so that the separation can be stabilized, while the start point of the separation is directed outward so that the wind can be rectified to flow from the vehicle body 71 to the outer side in the vehicle width direction. Thus, the wind which has flowed from the front of the door mirror 1 and passed through the lower side of the support portion 41 and has been separated can flow to go farther from the door glass 83. Thus, the separated wind can be prevented from being attracted by the vehicle body 71 and the door glass 83 to be heard as sound. Thus, noise can be reduced. On this occasion, due to the effect of the wind which has passed through the lower side of the support portion 41, the wind which has passed through the upper side of the support portion 41 can be also guided to flow toward the outer side in the vehicle width direction so as to go farther from the vehicle body 71.

In addition, when the vehicle is running, cross wind may blow against the vehicle and wind passing through the vicinity of the door mirror 1 may be affected by the cross wind. Even on this occasion, the wind flowing through the lower side of the support portion 41 can be rectified by the bead portions 51 and 61 so as to flow not to approach the door glass 83. In addition, the wind flowing along the lower surface 43 as designated by the arrow g can be separated straightly by the bead portions 51 and 61 so that the wind can be prevented from meandering above the surface of the support portion 41 and hitting the door glass 83 due to the cross wind.

In the aforementioned door mirror 1, the support portion 41 has the rear surface 47 in the rear end 46. The rear surface 47 is extended in the up/down direction and connected to the upper surface 42 and the lower surface 43. Wind flowing along the upper surface 42 of the support portion 41 and wind flowing along the lower surface 43 of the support portion 41 can be separated from the upper surface 42 and the lower surface 43 easily by the rear surface 47. The wind separated from the support portion 41 can be prevented from going around along the rear end 46, so that the wind can flow to fly rearward. Accordingly, the wind which has passed through the lower side of the support portion 41 can be suppressed from going around to hit the door glass 83. Thus, noise can be reduced.

In the aforementioned door mirror 1, the front ends 52 and 62 of the bead portions 51 and 61 are formed at the rear of the front/rear-direction center of the support portion 41. When the bead portions 51 and 61 were formed rearward from the vicinity of the front edge 44 of the support portion 41, the bead portions 51 and 61 might generate wind noise. Thus, the bead portions 51 and 61 themselves might be the noise sources. In the door mirror 1, wind noise from the bead portions 51 and 61 can be suppressed by the bead portions 51 and 61 which are formed at the rear of the front/rear-direction center of the support portion 41 so that noise can be reduced. In addition, the separated wind can be rectified by the bead portions 51 and 61.

In the aforementioned door mirror 1, the rear ends 53 and 63 of the bead portions 51 and 61 are formed in front of the rear end 46 of the support portion 41. The curvature radius $R_1$ of the rear end 53, 63 of each bead portion 51, 61 is formed to be smaller than the curvature radius $R_2$ of the rear end 46 of the support portion 41. In order to enhance a separation effect to separate the wind rectified by the bead portion 51, 61 from the support portion 41, it is preferable that the curvature radius $R_1$ of the rear end 53, 63 of the bead portion 51, 61 is small. On the other hand, in terms of safety, it is preferable that no protruding portion small in curvature radius is provided in the end portion of the support portion 41 which is provided to protrude toward the outside of the vehicle. In the aforementioned door mirror 1, the rear end 53, 63 of the bead portion 51, 61 is formed in front of the rear end 46 of the support portion 41. Accordingly, the support portion 41 has a shape with a step in the rear portion thereof. Moreover, the curvature radius $R_1$ of the rear end 53, 63 is formed to be smaller than the curvature radius $R_2$ of the rear end 46. Therefore, the rear end 46 large in curvature radius is provided in the rear side of the support portion 41. Accordingly, no protruding portion is provided in the rear side of the support portion 41 so that safety can be enhanced. In addition, the separation effect in the rear ends 53 and 63 of the bead portions 51 and 61 small in curvature radius can be enhanced.

(3. Modifications)

Although the embodiment of the invention has been described above, the invention is not limited to the aforementioned embodiment but may be modified variously and carried out without departing from the scope and spirit of the invention.

Although the aforementioned embodiment has been described in the case where the two bead portions 51 and 61 are provided in the lower surface 43, the number of bead portions is not limited to two. For example, one bead portion may be formed in order to make the wind flowing along the lower surface 43 flow toward the vehicle-width-direction outer side while the configuration is made as simple as possible, or three or more bead portions may be provided in consideration of the point that the wind flowing along the lower surface 43 can be rectified and separated from the support portion 41 easily. In addition, the specific shape of each bead portion 51, 61 is not limited to the aforementioned shape. Any shape may be used as long as the bead portion 51, 61 is provided to protrude downward from the lower surface 43 of the support portion 41 and provided to extend in the front/rear direction of the vehicle so as to be gradually separated from the side surface of the vehicle as it goes toward the rear.

Although the aforementioned embodiment has been described in the case where the bead portions 51 and 61 are formed integrally with the lower side member 49 of the support portion 41, the bead portions 51 and 61 may be configured to be mounted on the lower side of the support portion 41 after the bead portions 51 and 61 are molded separately from the support portion 41.

Although the aforementioned embodiment has been described in the case where the upper surface 42 of the support portion 41 is formed into a flat shape, the shape of the upper surface 42 is not limited thereto. Any shape may be used as the shape of the upper surface 42 as long as the lower surface 43 at least has an arc shape curved convexly downward in the vertically sectional shape of the support portion 41 in the front/rear direction of the vehicle and the flow velocity of wind passing through the lower side of the support portion 41 is higher than the flow velocity of wind passing through the upper side of the support portion 41. For example, the upper surface 42 may be formed to be dented downward, or the upper surface 42 may be formed to bulge upward as long as the upward bulging degree of the upper surface 42 is smaller than the downward bulging degree of the lower surface 43.

According to the disclosed door mirror of the vehicle, it is possible to enhance and rectify the flow velocity of wind passing through the lower side of the support portion when the vehicle is running. The support portion supports the housing of the door mirror from below. Accordingly, it is possible to reduce aerodynamic noise caused by the flows of winds in the vicinity of the door mirror.

What is claimed is:

1. A door mirror for a vehicle, the door mirror including a housing in which a mirror is accommodated, and a base portion adapted to attach the housing to a side surface of a vehicle body, wherein:

the base portion includes an attachment portion which is fixed to the side surface of the vehicle body and a support portion which is provided to protrude from the attachment portion laterally from the vehicle, and which is adapted to support the housing from below; and the support portion is formed with a vertical cross-sectional shape extending in the direction of forward travel of the vehicle of an inverse wing having a lower surface bulging downward, and the support portion is provided with a bead portion on the lower surface of the support portion, the bead portion protruding downward and extending generally in the direction of forward travel of the vehicle and oriented so as to be gradually spaced at an increasing distance from the side surface of the vehicle body as it extends toward a rear of the vehicle.

2. The door mirror according to claim 1, wherein the support portion has a generally vertical rear surface which extends at a rear end of the support portion and is connected to an upper surface and to the lower surface.

3. The door mirror according to claim 2, wherein the bead portion is formed at a rear part of the support portion.

4. The door mirror according to claim 3, wherein:

a rear end of the bead portion is disposed in front of a rear end of the support portion; and a curvature radius of the rear end of the bead portion is smaller than a curvature radius of the rear end of the support portion.

5. The door mirror according to claim 2, wherein:

a rear end of the bead portion is disposed in front of a rear end of the support portion; and a curvature radius of the rear end of the bead portion is smaller than a curvature radius of the rear end of the support portion.

6. The door mirror according to claim 1, wherein the bead portion is formed at a rear part of the support portion.

7. The door mirror according to claim 6, wherein:

a rear end of the bead portion is disposed in front of a rear end of the support portion; and a curvature radius of the rear end of the bead portion is smaller than a curvature radius of the rear end of the support portion.

8. The door mirror according to claim 1, wherein:

a rear end of the bead portion is disposed in front of a rear end of the support portion; and a curvature radius of the rear end of the bead portion is smaller than a curvature radius of the rear end of the support portion.

9. A door mirror for a vehicle, the door mirror including a housing in which a mirror is accommodated and a base portion adapted to attach the housing to a side surface of a vehicle body, wherein the base portion includes an attachment portion which is fixed to the side surface of the vehicle body and a support portion which protrudes laterally from the vehicle and which is adapted to support the housing from below;

the support portion having a vertical cross-sectional shape, extending in the direction of forward travel of the vehicle, of an inverse wing having a flat upper surface and a lower surface bulging downward, the support portion further comprising a bead portion on the lower surface of the support portion, the bead portion protruding downward and extending generally in the direction of forward travel of the vehicle and oriented so as to be gradually spaced at an increasing distance from the side surface of the vehicle body as it extends toward a rear of the vehicle.

10. The door mirror according to claim 9, wherein
the support portion has a generally vertical rear surface at a rear end of the support portion and connected to the upper surface and to the lower surface.

11. The door mirror according to claim 10, wherein
the bead portion is formed at a rear part of the lower surface of the support portion.

12. The door mirror according to claim 9, wherein
the bead portion is formed at a rear part of the lower surface of the support portion.

13. The door mirror according to claim 9, wherein:
a rear end of the bead portion terminates forward of a rear end of the lower surface of the support portion; and
a curvature radius of the rear end of the bead portion is smaller than a curvature radius of the rear end of the lower surface of the support portion.

\* \* \* \* \*